US005577969A

United States Patent [19]

Watarai

[11] Patent Number: 5,577,969

[45] Date of Patent: Nov. 26, 1996

[54] SHIFTING APPARATUS FOR OPERATING FRONT AND REAR DERAILLEURS WITH A SINGLE MANUAL LEVEL

[75] Inventor: Etsuyoshi Watarai, Sakai, Japan

[73] Assignee: Shimano, Inc., Osaka, Japan

[21] Appl. No.: 318,282

[22] Filed: Oct. 4, 1994

[30] Foreign Application Priority Data

Oct. 6, 1993 [JP] Japan .................................... 5-250268

[51] Int. Cl.[6] .................................................... F16H 59/00

[52] U.S. Cl. ................................................................ 474/78

[58] Field of Search ............................ 474/69, 70, 77–81

[56] References Cited

U.S. PATENT DOCUMENTS

| | | | |
|---|---|---|---|
| 3,901,095 | 8/1975 | Wechsler | 74/217 |
| 3,965,763 | 6/1976 | Wechsler | 74/217 |
| 4,055,093 | 10/1977 | Ross | 74/501 |
| 4,194,408 | 3/1980 | Hedrich | 74/217 |
| 4,201,095 | 5/1980 | Cirami | 74/217 |
| 4,279,174 | 7/1981 | Ross | 74/473 |
| 4,412,828 | 11/1983 | Darby | 474/81 |
| 4,530,678 | 7/1985 | Wechsler | 474/78 |
| 4,619,631 | 10/1986 | Darby | 474/80 |
| 5,033,991 | 7/1991 | McLaren | 474/78 |
| 5,213,548 | 5/1993 | Colbert | 474/71 |
| 5,358,451 | 10/1994 | Lacombe et al. | 474/78 |

FOREIGN PATENT DOCUMENTS

| | | | |
|---|---|---|---|
| 529664 | 3/1993 | European Pat. Off. | B62J 39/00 |
| 91/17078 | 11/1991 | WIPO | B62M 19/00 |
| 94/00330 | 1/1994 | WIPO | B62M 25/08 |

*Primary Examiner*—Michael Powell Buiz
*Attorney, Agent, or Firm*—James A. Deland

[57] ABSTRACT

A multispeed bicycle having a plurality of front chainwheels, a plurality of rear gears, front and rear derailleurs, and a shifting apparatus operable by a single manual lever to actuate the front and rear derailleurs. The shifting apparatus includes a first actuating mechanism for actuating the front derailleur, a second actuating mechanism for actuating the rear derailleur, and a shift controller for controlling the actuating mechanisms. The shift controller is responsive to operation of the manual lever to drive the first actuating mechanism or second actuating mechanism to produce a speed stage, and responsive to repeated operation of the manual lever to produce all speed stages corresponding to all combinations of the front chainwheels and rear gears.

19 Claims, 4 Drawing Sheets potentiometer
27
FM
24
RM
34
potentiometer
37
F driver
25
R driver
35
40
41
processor
speed setter
45
rear speed detector
44
front speed detector
43
operation detector
42
SW
13a
SW
13b

SHIFTING APPARATUS FOR OPERATING FRONT AND REAR DERAILLEURS WITH A SINGLE MANUAL LEVEL

BACKGROUND OF THE INVENTION

1. Field of the Invention

The present invention relates to a shifting apparatus for a multispeed bicycle having a plurality of front chainwheels, a plurality of rear gears, and front and rear derailleurs. This shifting apparatus is operable with a single manual lever to actuate the two derailleurs.

2. Description of the Related Art

A known shifting apparatus for a multispeed bicycle as noted above is disclosed in U.S. Pat. No. 4,194,408, for example. The bicycle has two front chainwheels, five rear gears, and front and rear derailleurs for changing a chain among these chainwheels and gears. The shifting apparatus includes a pair of change speed cams rotatable by a single manual lever, a pivot link pivotable by one of the change speed cams to pull or relax a control cable connected to the front derailleur, and a pivot link pivotable by the other change speed cam to pull or relax a control cable connected to the rear derailleur. When the manual lever is operated, the pair of change speed cams cause one or both of the derailleurs to change the chain among the front chainwheels and/or rear gears. Thus, the shifting apparatus provides 10 speed stages.

With an operation of the shifting apparatus, the chain may be changed both between the front chainwheels and between the rear gears. For example, the chain may be changed from the smaller front chainwheel to the larger front chainwheel and from the smallest rear gear to the largest rear gear, or from the larger front chainwheel to the smaller front chainwheel and from the largest rear gear to the smallest rear gear. A relatively long time is required to complete the actual shifting operation. For an interval of time must be set between the change at the front and the change at the rear, e.g. the chain is changed at the front and thereafter at the rear. This is necessary to avoid the chain coming off the chainwheels or gears which tends to occur when the chain is changed simultaneously at the front and the rear.

SUMMARY OF THE INVENTION

The object of the present invention is to provide a shifting apparatus for a bicycle which causes front and rear derailleurs to produce quickly and reliably all speed stages available from combinations of a plurality of front chainwheels and a plurality of rear gears.

The above object is fulfilled, according to the present invention, by a shifting apparatus for a bicycle having a first actuating mechanism for actuating a front derailleur, a second actuating mechanism for actuating a rear derailleur, and a single manual lever, the shifting apparatus comprising a shift controller responsive to operation of the manual lever to drive the first actuating mechanism or the second actuating mechanism to produce a speed stage, and responsive to repeated operation of the manual lever to produce all speed stages corresponding to all combinations of the front chainwheels and rear gears.

With this shifting apparatus, when the manual lever is operated, only the front derailleur or rear derailleur changes the chain to establish a speed stage corresponding to the lever operation. Such lever operations produce all speed stages by combinations of the front chainwheels and rear gears.

Thus, simple shifting operations to control the single manual lever produce all speed stages by the combinations of the front chainwheels and rear gears. These speed stages may be used effectively to make subtle speed adjustments in response to subtle variations in running load, for example, to realize smooth running. Since the chain is changed by action of only the front derailleur or the rear derailleur to provide a new speed stage, there is little chance of the chain coming off the front chainwheels or rear gears, and shifting operations may be effected with excellent responsivity at all times.

Other features and advantages of the present invention will be apparent from the following description of an embodiment to be had with reference to the drawings.

DETAILED DESCRIPTION OF THE PREFERRED EMBODIMENT

Figure 1:
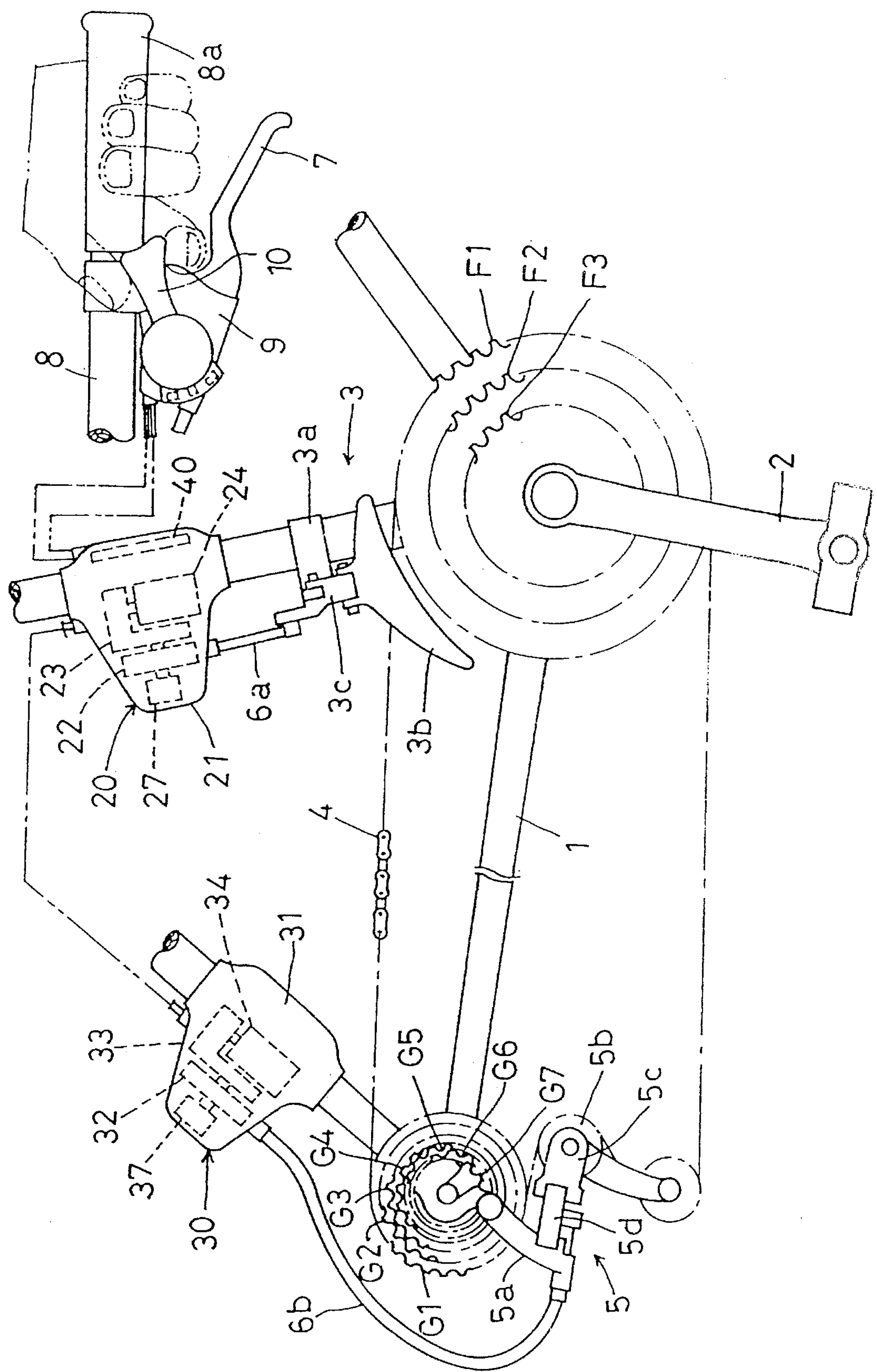
FIG. 1 is a schematic side view of a bicycle having a shifting apparatus according to the present invention.

FIG. 1 shows a change speed system of a multispeed bicycle. This system includes three front chainwheels F1, F2 and F3 having different numbers of teeth, which are rotatably mounted on a bottom bracket of a bicycle body frame 1 and driven by a crank 2; a front derailleur 3 attached to a seat tube of the body frame 1 by a clamp band *3a* and having a chain guide *3b* for changing a chain 4 among the front chainwheels F1, F2 and F3; seven rear gears G1–G7 having different numbers of teeth, which are rotatably mounted on a rear fork end of the body frame 1 and rotated by the front chainwheels F1, F2 and F3 through the chain 4 to drive a rear wheel of the bicycle; a rear derailleur 5 attached to the rear fork end by a bracket *5a* and having a guide pulley *5b* for changing the chain 4 among the rear gears G1–G7; and a shifting device particularly described hereunder.

As shown in FIG. 1, the shifting device includes a front actuating mechanism 20 attached to the seat tube of the body frame 1 for actuating the front derailleur 3, a rear actuating mechanism 30 attached to a back fork of the body frame 1 for actuating the rear derailleur 5, and a shift controller 40 for controlling the front actuating mechanism 20 and rear actuating mechanism 30. The shift controller 40 is mounted in a case 21 of the front actuating mechanism 20. A single manual lever 10 is attached to a brake lever bracket 9 along with a brake lever 7 to be disposed adjacent a grip *8a* of a handlebar 8. Operation of the manual lever 10 is transmitted to the shift controller 40 as particularly described hereinafter.

Figure 2:
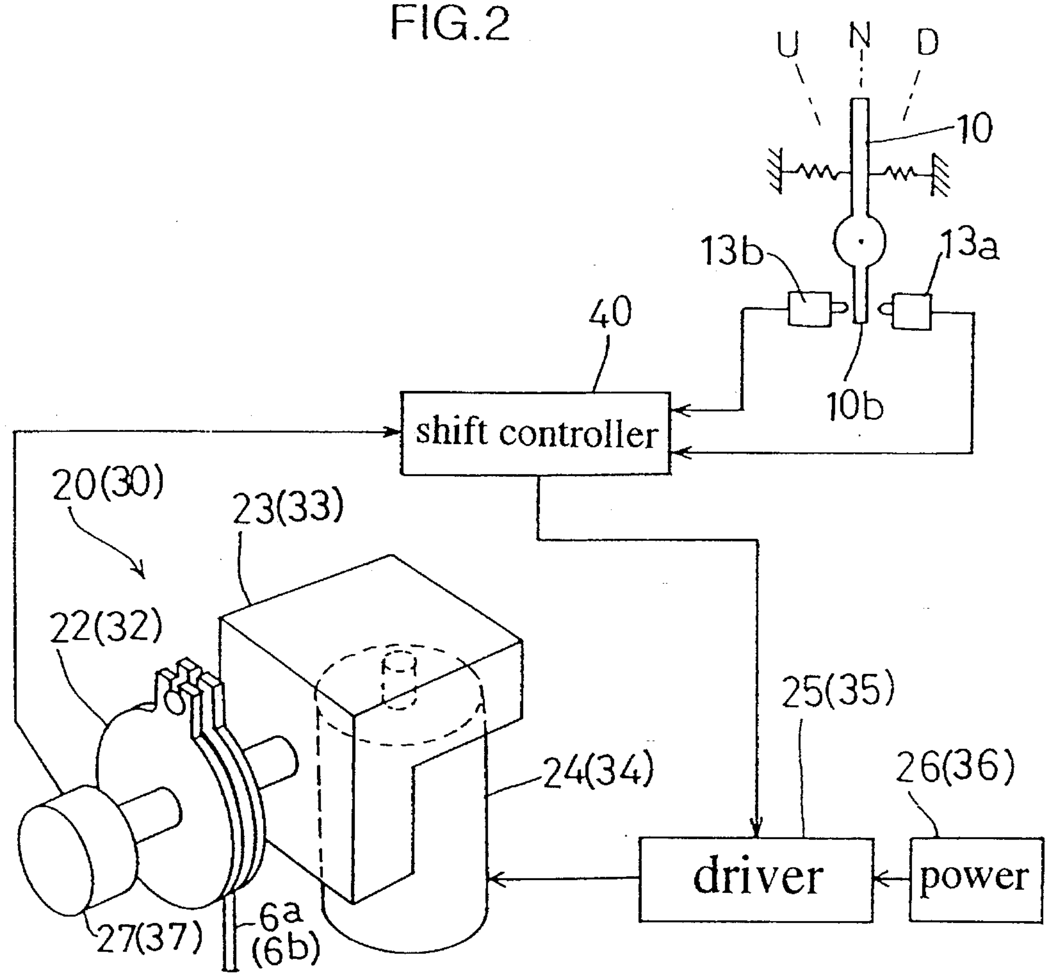
FIG. 2 is a schematic perspective view of an actuating mechanism.

As shown in FIG. 1, the front actuating mechanism 20 has the case 21 attached to the seat tube. Referring to FIG. 2, the case 21 contains a takeup element 22, a reduction mechanism 23, a reversible electric motor 24, a drive circuit 25, a battery power source 26 and a rotary potentiometer 27. The potentiometer 27 detects a rotational position of the takeup element 22 and produces an electric signal indicative of a front speed stage based on the detection. The drive circuit 25 is operable in response to a predetermined signal received from the shift controller 40 to rotate the electric motor 24 forward or backward. Then the electric motor 24 transmits a torque, which is reduced by the reduction mechanism 23, to the takeup element 22 whereby the takeup element 22 winds or unwinds a control cable 6*a*. When the takeup element 22 winds the control cable 6*a*, a pulling force of the control cable 6*a* causes a pivot link 3*c* between the chain guide 3*b* and band 3*a* of the front derailleur 3 to pivot inwardly of the body frame 1 relative to the band 3*a*. As a result, the chain guide 3*b* pushes the chain 4 to change from a larger one to a smaller one of the front chainwheels F1, F2 and F3. When the takeup element 22 unwinds the control cable 6*a*, a return spring (not shown) of the front derailleur 3 causes the pivot link 3*c* to pivot outwardly of the body frame 1 relative to the band 3*a*. As a result, the chain guide 3*b* pushes the chain 4 to change from a smaller one to a larger one of the front chainwheels F1, F2 and F3. When a selected speed stage is established with the chain 4 placed in engagement with one of the front chainwheels F1, F2 and F3, the shift controller 40 transmits a signal based on a result of detection by the potentiometer 27 to the drive circuit 25. Then, the drive circuit 25 stops the electric motor 24 whereupon the takeup element 22 stops winding or unwinding the control cable 6*a*. The control cable 6*a* or return spring becomes inoperative to complete the operation of chain guide 3*b* to change the chain 4. Thus, in response to a signal from the shift controller 40, the front actuating mechanism 20 actuates the front derailleur 3 through the control cable 6*a*.

The rear actuating mechanism 30 has substantially the same construction as the front actuating mechanism 20, and will be described referring again to FIG. 2 showing the front actuating mechanism 20. In FIG. 2, numerals in parentheses denote the components of the rear actuating mechanism 30. As shown in FIG. 1, the rear actuating mechanism 30 has a case 31 fixed to the back fork of the body frame 1. Referring to FIG. 2, the case 31 contains a takeup element 32, a reduction mechanism 33, a reversible electric motor 34, a drive circuit 35, a battery power source 36 and a rotary potentiometer 37. The potentiometer 37 detects a rotational position of the takeup element 32 and produces an electric signal indicative of a rear speed stage based on the detection. The drive circuit 35 is operable in response to a predetermined signal received from the shift controller 40 to rotate the electric motor 34, whereby the takeup element 32 winds or unwinds a control cable 6*b*. When the takeup element 32 winds the control cable 6*b*, a pulling force of the control cable 6*b* causes a pivot link 5*d* between the bracket 5*a* of the rear derailleur 5 and a support 5*c* of the guide pulley 5*b* to pivot inwardly of the body frame 1 relative to the bracket 5*a*. As a result, the guide pulley 5*b* pushes the chain 4 to change from a larger one to a smaller one of the rear gears G1–G7. When the takeup element 32 unwinds the control cable 6*b*, a return spring (not shown) of the rear derailleur 5 causes the pivot link 5*d* to pivot outwardly of the body frame 1 relative to the bracket 5*a*. As a result, the guide pulley 5*b* pushes the chain 4 to change from a smaller one to a larger one of the rear gears G1–G7. When a selected speed stage is established with the chain 4 placed in engagement with one of the rear gears G1–G7, the shift controller 40 transmits a signal based on a result of detection by the potentiometer 37 to the drive circuit 35. Then, the drive circuit 35 stops the electric motor 34 whereupon the takeup element 32 stops winding or unwinding the control cable 6*b*. The control cable 6*b* or return spring becomes inoperative to complete the operation of guide pulley 5*b* to change the chain 4. Thus, in response to a signal from the shift controller 40, the rear actuating mechanism 30 actuates the rear derailleur 5 through the control cable 6*b*.

Figure 3:
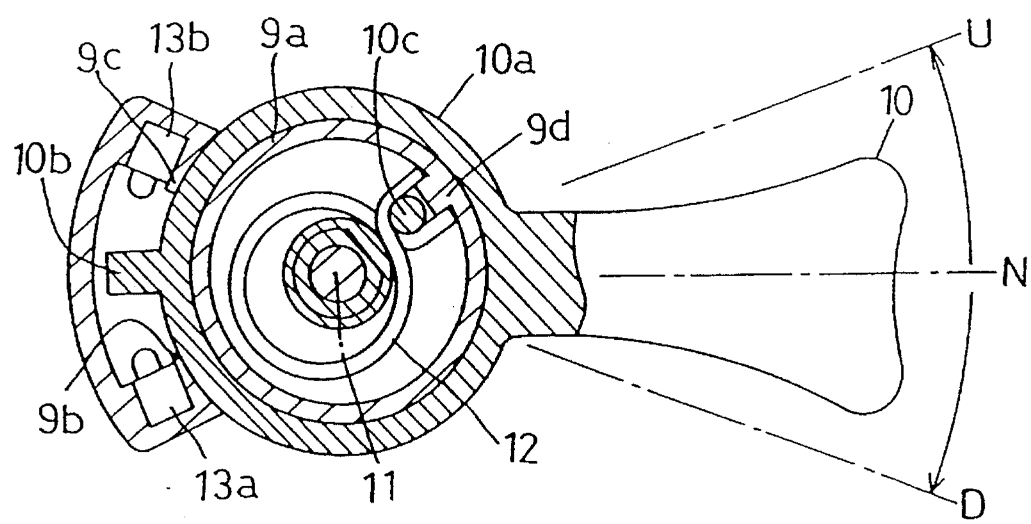
FIG. 3 is a sectional view of a proximal portion of a manual lever.

As shown in FIG. 3, the manual lever 10 has a proximal end 10*a* thereof rotatably attached to a lever support 9*a* of the lever bracket 9. Thus, the manual lever 10 is pivotable about an axis 11 by the rider's hand holding the grip 8*a* of the handlebar 8, between an accelerating position U and a decelerating position D across a neutral position N. The proximal end 10*a* of the manual lever 10 includes a switch operator 10*b*. When the manual lever 10 is in the accelerating position U, the switch controller 10*b* contacts a stopper 9*b* formed in the lever bracket 9. When the manual lever 10 is in the decelerating position D, the switch controller 10*b* contacts a stopper 9*c* formed in the lever bracket 9.

A return spring 12 is disposed on a side wall of the proximal end 10*a* of the manual lever 10. The proximal ends 10*a* includes a spring presser 10*c* while the lever support 9*a* includes a spring bearing 9*d*. When the manual lever 10 is operated to the accelerating position U, the spring bearing 9*d* supports one end of the return spring 12, and the spring presser 10*c* pushes the other end of the return spring 12. This elastically deforms the return spring 12 to bias the manual lever 10 toward the neutral position N. When the manual lever 10 is operated to the decelerating position D, the spring bearing 9*d* supports the other end of the return spring 12, and the spring presser 10*c* pushes the one end of the return spring 12. This elastically deforms the return spring 12 to bias the manual lever 10 toward the neutral position N. That is, the return spring 12 is operable to maintain the manual lever 10 in the neutral position N, and to return the manual lever 10 automatically from the accelerating position U or decelerating position D to the neutral position N.

The lever support 9*a* further supports a pair of detection switches 13*a* and 13*b*. When the manual lever 10 is operated to the accelerating position U, the switch operator 10*b* presses upon one of the detection switches 13*a*. When the manual lever 10 is operated to the decelerating position D, the switch operator 10*b* presses upon the other detection switch 13*b*. Thus, a shifting operation effected in the accelerating direction is detected by one of the detection switches 13*a* which transmits a corresponding electric signal to the shift controller 40. A shifting operation effected in the decelerating direction is detected by the other detection switches 13*b* which transmits a corresponding electric signal to the shift controller 40.

Figure 4:
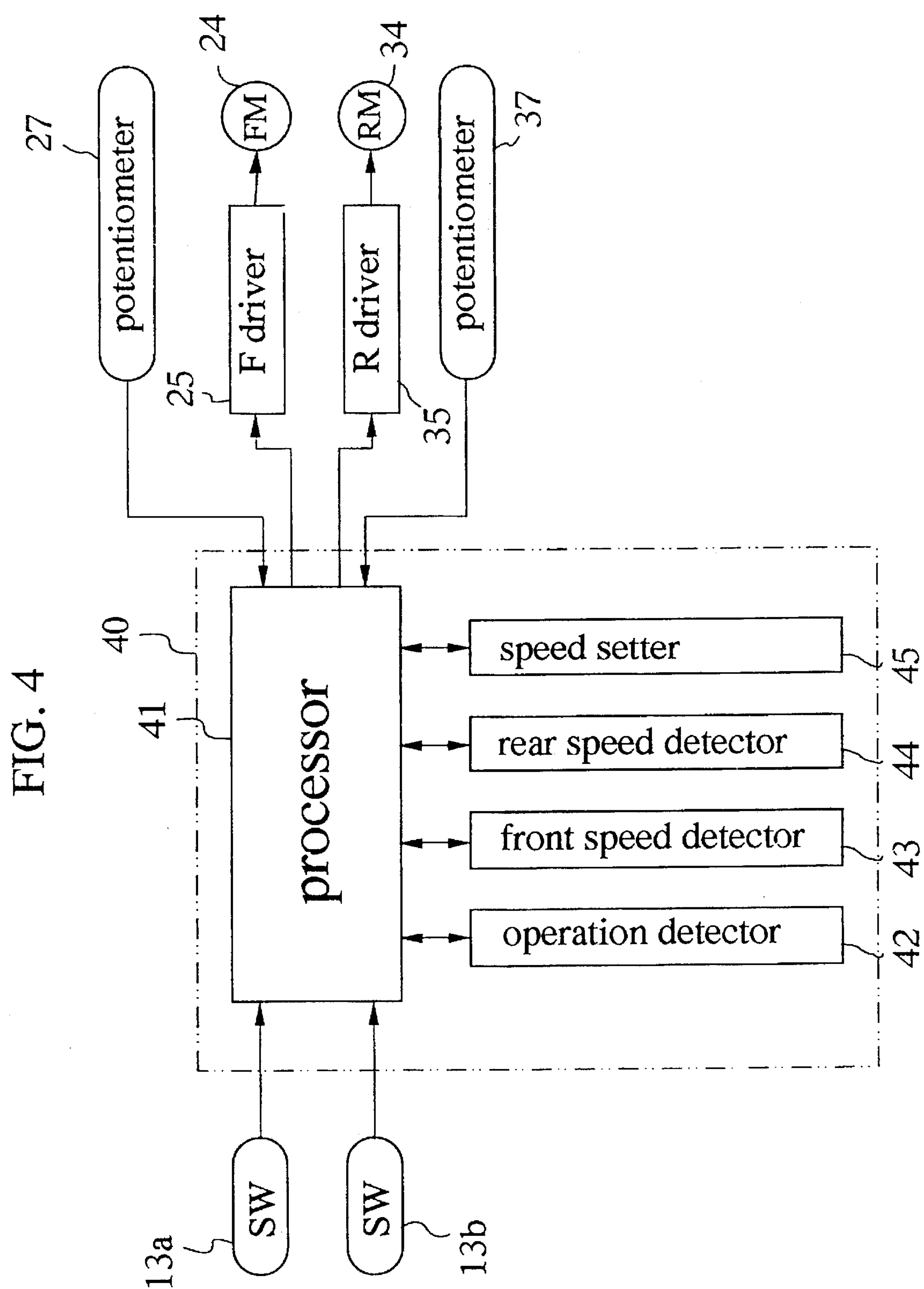
FIG. 4 is a block diagram of a control system for controlling the shifting apparatus.

As shown in FIG. 4, the shift controller 40 includes a microcomputer as a central component thereof, which essentially is programmed to provide a processing unit 41, a shifting operation detecting unit 42, a front speed detecting unit 43, a rear speed detecting unit 44 and a speed setting unit 45.

Figure 5:
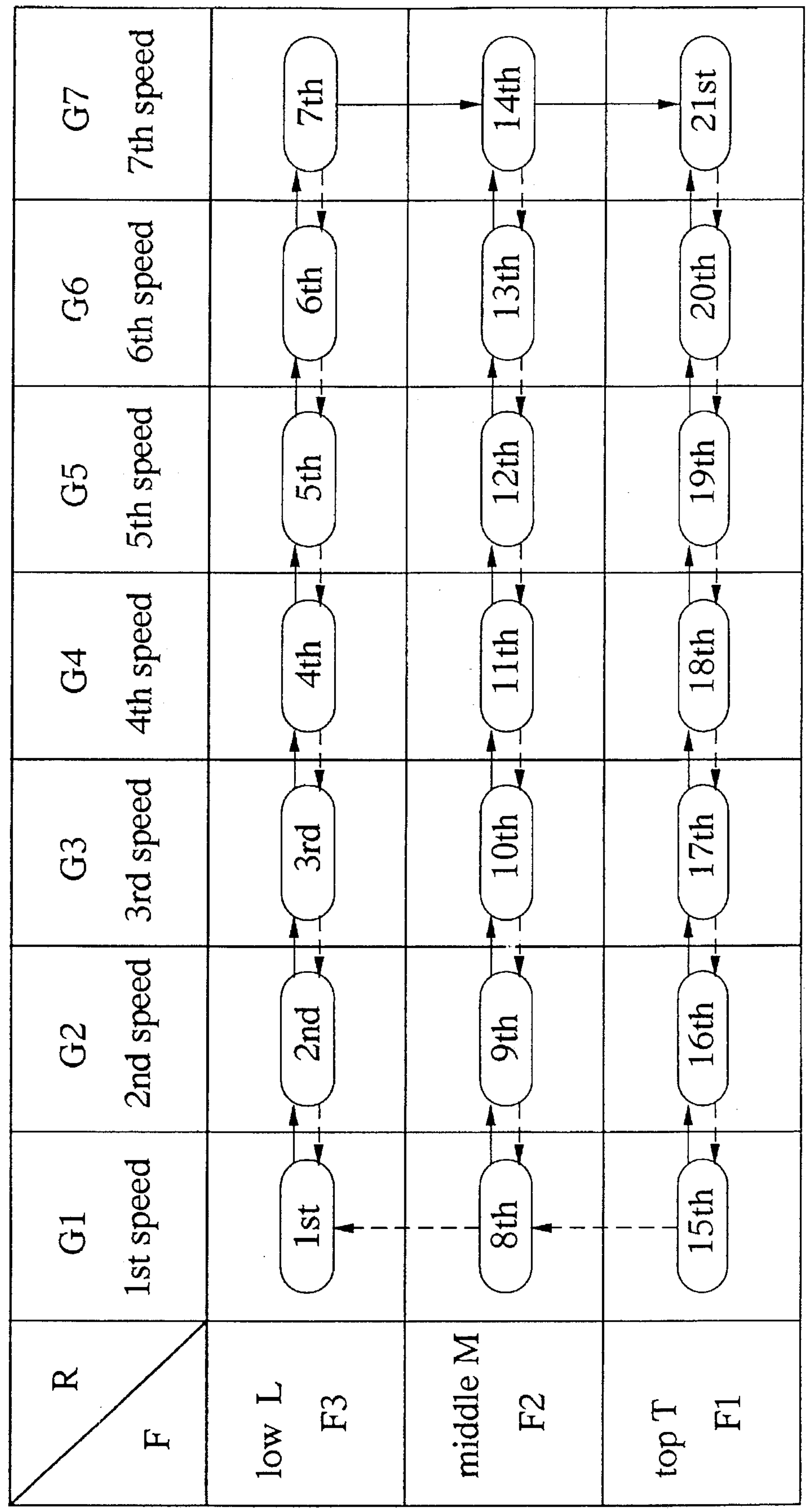
FIG. 5 is an explanatory view of a change speed pattern.

When the manual lever 10 is operated to the accelerating position U or decelerating position D, the processing unit 41 and shifting operation detecting unit 42 process the signal received from the detection switch 13*a* or 13*b*. The shifting operation detecting unit 42 determines whether the manual lever 10 is operated to the accelerating position U or to the decelerating position D. The processing unit 41, front speed detecting unit 43 and rear speed detecting unit 44 process the signals received from the potentiometers 27 and 37. The front speed detecting unit 43 determines a current front speed stage, i.e. one of top speed T, middle speed M and low speed L. The rear speed detecting unit 44 determines a current rear speed stage, i.e. one of the first to seventh speeds. The speed setting unit 45 sets a target speed to be attained, based on the direction of a shifting operation detected by the shifting operation detecting unit 42, the front speed stage detected by the front speed detecting unit 43, the rear speed stage detected by the rear speed detecting unit 44, and a change speed pattern inputted in advance. FIG. 5 shows the change speed pattern inputted in advance for setting a target speed. This pattern provides a first to a twenty-first speed stages based on various combinations of the three front chainwheels F1, F2 and F3 and seven rear gears G1–G7. One of the twenty-one speed stages is set as the target speed. When the manual lever 10 is operated to the accelerating position U, the target speed is a speed stage next in the direction of a solid line arrow to a speed stage functioning before the shifting operation. When the manual lever 10 is operated to the decelerating position D, the target speed is a speed stage next in the direction of a broken line arrow to a speed stage functioning before the shifting operation. The processing unit 41 outputs signals to the drive circuits 25 and 35 to move or stop the front derailleur 3 and rear derailleur 5 to/at positions to produce the target speed set by the speed setting unit 45.

In FIG. 5, low speed L, middle speed M and top speed T are the front speed stages. The low speed L is the speed stage provided when the chain 4 is engaged with the smallest F3 of the front chainwheels F1, F2 and F3. The middle speed M is the speed stage provided when the chain 4 is engaged with the intermediate front chainwheel F2. The top speed T is the speed stage provided when the chain 4 is engaged with the largest front chainwheel F1. The first to seventh speeds are the rear speed stages. The first speed is provided when the chain 4 is engaged with the largest G1 of the rear gears G1–G7. The second speed is provided when the chain 4 is engaged with the second largest rear gear G2. The third speed is provided when the chain 4 is engaged with the third largest rear gear G3. The fourth speed is provided when the chain 4 is engaged with the fourth rear gear G4. The fifth speed is provided when the chain 4 is engaged with the fifth rear gear G5. The sixth speed is provided when the chain 4 is engaged with the sixth rear gear G6. The seventh speed is provided when the chain 4 is engaged with the seventh or smallest rear gear G7. The first to twenty-first speeds are the speed stages of the shifting device as a whole, which are produced by the combinations of the front and rear speed stages. The first to seventh speeds are provided when the front speed stage is low speed L and the rear speed stage is the first to seventh speeds. The eighth to fourteenth speeds are provided when the front speed stage is middle speed M and the rear speed is the first to seventh speeds. The fifteenth to twenty-first speeds are provided when the front speed stage is top speed T and the rear speed is the first to seventh speeds. For example, the first speed is provided when the front speed stage is low speed L and the rear speed stage is the first speed. The seventh speed is provided when the front speed stage is low speed L and the rear speed stage is the seventh speed. The eighth speed is provided when the front speed stage is middle speed M and the rear speed stage is the first speed. The fourteenth speed is provided when the front speed stage is middle speed M and the rear speed stage is the seventh speed. The fifteenth speed is provided when the front speed stage is top speed T and the rear speed stage is the first speed. The twenty-first speed is provided when the front speed stage is top speed T and the rear speed stage is the seventh speed.

That is, when the manual lever 10 is operated to the accelerating position U, the shift controller 40 sets a target speed as shown in FIG. 5, and transmits predetermined signals to the front actuating mechanism 20 and rear actuating mechanism 30. As a result, depending on a speed stage functioning before the shifting operation, the front derailleur 3 or rear derailleur 5 is operated to establish a next speed stage in the direction of a solid line arrow shown in FIG. 5. When the manual lever 10 is operated to the decelerating position D, the shift controller 40 sets a target speed as shown in FIG. 5, and transmits predetermined signals to the front actuating mechanism 20 and rear actuating mechanism 30. As a result, depending on a speed stage functioning before the shifting operation, the front derailleur 3 or rear derailleur 5 is operated to establish a next speed stage in the direction of a broken line arrow shown in FIG. 5. As a whole, the shift controller 40 is operable to set target speeds as shown in FIG. 5, whereby all of the first to twenty-first speed stages may be established by combinations of the three front chainwheels F1–F3 and seven rear gears G1–G7.

When a shifting operation is repeatedly carded out in the accelerating direction in a state in which the chain 4 is engaged with the smallest front chainwheel F3 and the largest rear gear G1 to provide the first speed stage, the front derailleur 3 remains out of operation to maintain the chain 4 on the smallest front chainwheel F3, and the rear derailleur 5 is operated to change the chain 4 successively to the smaller rear gears, thereby successively to switch from the first speed stage to the seventh speed stage. When a shifting operation is repeatedly carded out in the accelerating direction after the chain 4 is engaged with the smallest rear gear G7 providing the seventh speed stage, the rear derailleur 5 is stopped to maintain the chain 4 on the smallest rear gear G7, and the front derailleur 3 is operated to change the chain 4 successively to the larger front chainwheels, thereby to switch from the seventh speed stage to the fourteenth speed stage and to the twenty-first speed stage. When a shifting operation is repeatedly carded out in the accelerating direction in a state in which the chain 4 is engaged with the intermediate front chainwheel F2 and the largest rear gears G1 to provide the eighth speed stage, the front derailleur 3 remains out of operation to maintain the chain 4 on the intermediate front chainwheel F2, and the rear derailleur 5 is operated to change the chain 4 successively to the smaller rear gears, thereby successively to switch from the eighth speed stage to the fourteenth speed stage. When a shifting operation is carried out in the accelerating direction after the chain 4 is engaged with the smallest rear gear G7 providing the fourteenth speed stage, the rear derailleur 5 is stopped to maintain the chain 4 on the smallest rear gear G7, and the front derailleur 3 is operated to change the chain 4 to the largest front chainwheels F1, thereby to switch from the fourteenth speed stage to the twenty-first speed stage. When a shifting operation is carried out in the accelerating direction with the chain 4 engaged with the largest front chainwheel F1 and largest rear gear G1 providing the fifteenth speed stage, the front derailleur 3 is stopped to maintain the chain 4 on the largest front chainwheel F1, and the rear derailleur 5 is operated to change the chain 4 successively to the smaller rear gears, thereby successively to switch from the fifteenth speed stage to the twenty-first speed stage.

When a shifting operation is repeatedly carried out in the decelerating direction in a state in which the chain 4 is engaged with the largest front chainwheel F1 and the smallest rear gear G7 to provide the twenty-first speed stage, the front derailleur 3 remains out of operation to maintain the chain 4 on the largest front chainwheel F1, and the rear derailleur 5 is operated to change the chain 4 successively to the larger rear gears, thereby successively to switch from the twenty-first speed stage to the fifteenth speed stage. When a shifting operation is repeatedly carried out in the decelerating direction after the fifteen speed stage is established, the rear derailleur 5 is stopped to maintain the chain 4 on the largest rear gear G1, and the front derailleur 3 is operated to change the chain 4 successively to the smaller front chainwheels, thereby to switch from the fifteenth speed stage to the eighth speed stage and to the first speed stage. When a shifting operation is repeatedly carried out in the decelerating direction in a state in which the chain 4 is engaged with the intermediate front chainwheel F2 and the smallest rear gears G7 to provide the fourteenth speed stage, the front derailleur 3 remains out of operation to maintain the chain 4 on the intermediate front chainwheel F2, and the rear derailleur 5 is operated to change the chain 4 successively to the larger rear gears, thereby successively to switch from the fourteenth speed stage to the eighth speed stage. When a shifting operation is carried out in the decelerating direction after the eighth speed stage is established, the rear derailleur 5 is stopped to maintain the chain 4 on the largest rear gear G1, and the front derailleur 3 is operated to change the chain 4 to the smallest front chainwheel F3, thereby to switch from the eighth speed stage to the first speed stage. When a shifting operation is carried out in the decelerating direction with the chain 4 engaged with the smallest front chainwheel F3 and smallest rear gear G7 providing the seventh speed stage, the front derailleur 3 is stopped to maintain the chain 4 on the smallest front chainwheel F3, and the rear derailleur 5 is operated to change the chain 4 successively to the larger rear gears, thereby successively to switch from the seventh speed stage to the first speed stage.

The front actuating mechanism or rear actuating mechanism may be replaced with a mechanism for convening the bicycle driving torque of the chain, gears or wheels into power for operating the chain guide or guide pulley. This converting mechanism may be operable by a control mechanism switchable between operative state and inoperative state by electric signals. When a predetermined electric signal is inputted, the chain guide or guide pulley is operated by the bicycle driving power to change the chain. Instead of the electrical connection between the single manual lever and the two derailleurs, a mechanical interlocking structure may be employed to transmit an operating force of the manual lever to the derailleurs through a cam mechanism and control cables. In this modification, the two derailleurs are operable only by a manual operating force applied to the single manual lever. In the described embodiment, the shifting apparatus provides a total of 21 speed stages by combinations of the three front chainwheels and seven rear gears. The number of front chainwheels may be two instead of three, and the number of rear gears may be six or eight instead of seven. Thus, the present invention is applicable also to a shifting apparatus constructed to provide more than or less than 21 speed stages.

What is claimed is:

1. In a multispeed bicycle having a plurality of front chainwheels, a plurality of rear gears, front and rear derailleur mechanisms and a shifting apparatus operable by a single manual lever to actuate the front and rear derailleur mechanisms, said shifting apparatus comprising:

- a first actuating mechanism for actuating said front derailleur mechanism;
- a second actuating mechanism for actuating said rear derailleur mechanism;
- a shift controller responsive to operation of said manual lever to drive one of said first actuating mechanism and said second actuating mechanism to produce a speed stage, and responsive to repeated operation of said manual lever to produce all speed stages corresponding to all combinations of said front chainwheels and said rear gears; and
- wherein only said second actuating mechanism is operated when accelerating operations are effected successively from a speed stage (minimum speed) provided by a combination of the smallest front chainwheel and the largest rear gear to a speed stage provided by a combination of the smallest front chainwheel and the smallest rear gear, and only said first actuating mechanism is operated when further accelerating operations are effected from the latter speed stage to a speed stage (maximum speed) provided by a combination of the largest front chainwheel and the smallest rear gear.

2. A shifting apparatus as defined in claim 1, wherein only said second actuating mechanism is operated when decelerating operations are effected successively from the speed stage (maximum speed) provided by the combination of the largest front chainwheel and the smallest rear gear to a speed stage provided by a combination of the largest front chainwheel and the largest rear gear, and only said first actuating mechanism is operated when further decelerating operations are effected from the latter speed stage to the speed stage (minimum speed) provided by the combination of the smallest front chainwheel and the largest rear gear.

3. A shifting apparatus as defined in claim 2, wherein only said second actuating mechanism is operated when accelerating operations are effected successively from a speed stage provided by a combination of a given front chainwheel and the largest rear gear to a speed stage provided by a combination of said given front chainwheel and the smallest rear gear, and only said first actuating mechanism is operated when further accelerating operations are effected from the latter speed stage to a speed stage (maximum speed) provided by the combination of the largest front chainwheel and the smallest rear gear.

4. A shifting apparatus as defined in claim 3, wherein only said second actuating mechanism is operated when decelerating operations are effected successively from the speed stage provided by the combination of said given front chainwheel and the smallest rear gear to the speed stage provided by a combination of said given front chainwheel and the largest rear gear, and only said first actuating mechanism is operated when further decelerating operations are effected from the latter speed stage to the speed stage (minimum speed) provided by the combination of the smallest front chainwheel and the largest rear gear.

5. In a multispeed bicycle having a plurality of front chainwheels, a plurality of rear gears and front and rear derailleur mechanisms, a shifting apparatus comprising:

- a single manual lever which is adapted to move between a first position and a second position, a neutral position being provided between said first and second positions and said manual lever being urged toward said neutral position:
- a first motor for actuating said front derailleur mechanism;
- a second motor for actuating said rear derailleur mechanism; and
- a shift controller responsive to operation of said manual lever to drive one of said first motor and said second motor to produce a speed stage, and responsive to repeated operation of said manual lever to said second position to produce a plurality of speed stages corresponding to a plurality of combinations of said front chainwheels and said rear gears.

6. In a multispeed bicycle having a plurality of front chainwheels, a plurality of rear gears, and front and rear derailleur mechanisms, a shifting apparatus comprising:

a single manual lever which is adapted to move between a first position and a second position;

a first actuating mechanism for actuating said front derailleur mechanism;

a second actuating mechanism for actuating said rear derailleur mechanism; and a shift controller responsive to operation of said manual lever to drive one of said first actuating mechanism and said second actuating mechanism to produce a speed stage, and responsive to repeated operation of said manual lever to said second position to produce a plurality of speed stages corresponding to a plurality of combinations of said front chainwheels and said rear gears.

7. The apparatus according to claim 6 wherein said first position comprises a neutral position and said second position comprises one of an accelerating position or a decelerating position.

8. The apparatus according to claim 6 wherein said lever comprises:

an elongated portion which pivots about an axis from said first position to said second position; and a switch member coupled to said elongated portion so that a speed stage is produced when said elongated member moves to said second position.

9. The apparatus according to claim 6 wherein said lever is adapted to move to a third position, wherein said first position comprises a neutral position disposed between said second position and said third position, and wherein said shift controller is responsive to operation of said manual lever to either said second position or said third position to produce a plurality of speed stages corresponding to a plurality of combinations of said front chainwheels and said rear gears.

10. The apparatus according to claim 9 wherein, when said lever moves to said second position, said shift controller drives one of said first actuating mechanism and said second actuating mechanism to produce only a higher speed stage, and wherein, when said lever moves to said third position, said shift controller drives one of said first actuating mechanism and said second actuating mechanism to produce only a lower speed stage.

11. The apparatus according to claim 9 wherein, when said lever moves to said second position, said shift controller drives one of said first actuating mechanism and said second actuating mechanism to produce a higher speed stage, and wherein, when said lever moves to said third position, said shift controller drives one of said first actuating mechanism and said second actuating mechanism to produce a lower speed stage.

12. The apparatus according to claim 11 wherein said lever comprises:

an elongated portion which pivots about an axis between said first position, said second position and said third position; and a switching member coupled to said elongated portion so that a speed stage is produced when said elongated member moves to either said second position or said third position.

13. The apparatus according to claim 12 further comprising a spring for biasing said lever to said first position.

14. The apparatus according to claim 11 wherein said lever comprises:

an elongated portion which pivots about an axis between said first position, said second position and said third position;

a first switch disposed at said second position; and a second switch disposed at said third position.

15. The apparatus according to claim 14 further comprising a spring for biasing said lever to said first position.

16. The apparatus according to claim 15 wherein said lever further comprises a switch operating member extending from said lever so that said axis is disposed between said elongated member and said switch operating member, wherein said switch operating member contacts said first switch when said lever is disposed at said second position, and wherein said switch operating member contacts said second switch when said lever is disposed at said third position.

17. A shifting apparatus as defined in claim 6, wherein only said second actuating mechanism is operated when decelerating operations are effected successively from the speed stage (maximum speed) provided by the combination of the largest front chainwheel and the smallest rear gear to a speed stage provided by a combination of the largest front chainwheel and the largest rear gear, and only said first actuating mechanism is operated when further decelerating operations are effected from the latter speed stage to the speed stage (minimum speed) provided by the combination of the smallest front chainwheel and the largest rear gear.

18. A shifting apparatus as defined in claim 10, wherein only said second actuating mechanism is operated when accelerating operations are effected successively from a speed stage provided by a combination of a given front chainwheel and the largest rear gear to a speed stage provided by a combination of said given front chainwheel and the smallest rear gear, and only said first actuating mechanism is operated when further accelerating operations are effected from the latter speed stage to a speed stage (maximum speed) provided by the combination of the largest front chainwheel and the smallest rear gear.

19. A shifting apparatus as defined in claim 14, wherein only said second actuating mechanism is operated when decelerating operations are effected successively from the speed stage provided by the combination of said given front chainwheel and the smallest rear gear to the speed stage provided by a combination of said given front chainwheel and the largest rear gear, and only said first actuating mechanism is operated when further decelerating operations are effected from the latter speed stage to the speed stage (minimum speed) provided by the combination of the smallest front chainwheel and the largest rear gear.

* * * * *

UNITED STATES PATENT AND TRADEMARK OFFICE

CERTIFICATE OF CORRECTION

PATENT NO. : 5,577,969

DATED : November 26, 1996

INVENTOR(S) : Etsuyoshi Watarai

It is certified that error appears in the above-indentified patent and that said Letters Patent is hereby corrected as shown below: Column 10, Claim 18, line 1, change "10" to --17--.
Claim 19, line 1, change "14" to --18--.

Signed and Sealed this

Fourth Day of March, 1997

Attest:

BRUCE LEHMAN

Attesting Officer

*Commissioner of Patents and Trademarks*